US011846982B1

(12) United States Patent
Chase

(10) Patent No.: US 11,846,982 B1
(45) Date of Patent: Dec. 19, 2023

(54) LAPTOP CASE AND COLLAPSIBLE SHADE SYSTEM

(71) Applicant: Ryan John Chase, Santa Monica, CA (US)

(72) Inventor: Ryan John Chase, Santa Monica, CA (US)

( * ) Notice: Subject to any disclaimer, the term of this patent is extended or adjusted under 35 U.S.C. 154(b) by 0 days.

(21) Appl. No.: 18/060,690

(22) Filed: Dec. 1, 2022

(51) Int. Cl.
*G06F 1/16* (2006.01)

(52) U.S. Cl.
CPC .......... *G06F 1/1603* (2013.01); *G06F 1/1616* (2013.01)

(58) Field of Classification Search
CPC .............................. G06F 1/1603; G06F 1/1616
USPC ......................................................... 206/320
See application file for complete search history.

(56) References Cited

U.S. PATENT DOCUMENTS

| 4,569,572 | A | * | 2/1986 | Kopich | G06F 1/1603 |
| | | | | | 348/832 |
| 4,633,324 | A | * | 12/1986 | Giulie | H04N 5/65 |
| | | | | | 348/E5.131 |
| 4,784,468 | A | * | 11/1988 | Tierney | H04N 5/65 |
| | | | | | 348/E5.131 |
| 5,115,345 | A | * | 5/1992 | Hobson | H04N 5/65 |
| | | | | | 359/507 |
| 5,325,970 | A | * | 7/1994 | Dillon | G06F 1/1628 |
| | | | | | 312/208.3 |
| 5,400,903 | A | * | 3/1995 | Cooley | A45C 13/02 |
| | | | | | 206/320 |
| 5,717,566 | A | * | 2/1998 | Tao | G06F 1/1603 |
| | | | | | 359/601 |
| 6,084,711 | A | * | 7/2000 | Duff | G06F 1/1603 |
| | | | | | 359/612 |
| 6,105,763 | A | * | 8/2000 | Saetia | A45C 5/14 |
| | | | | | 190/102 |
| 6,115,238 | A | * | 9/2000 | von Gutfeld | G06F 1/1603 |
| | | | | | 206/308.1 |
| 7,134,758 | B1 | * | 11/2006 | Baker | G06F 1/1603 |
| | | | | | 359/612 |
| 7,304,839 | B1 | | 12/2007 | Burns | |
| 7,508,657 | B1 | * | 3/2009 | Smith | H04M 1/0279 |
| | | | | | 361/679.24 |
| 10,963,010 | B1 | * | 3/2021 | Griffin | G02B 27/0018 |
| 2003/0217940 | A1 | * | 11/2003 | Russell | A45C 3/02 |
| | | | | | 206/320 |
| 2003/0223119 | A1 | * | 12/2003 | Heiman | A45C 3/02 |
| | | | | | 359/601 |
| 2003/0231399 | A1 | * | 12/2003 | Leitao | G02B 27/04 |
| | | | | | 359/614 |

(Continued)

*Primary Examiner* — Jacob K Ackun

(74) *Attorney, Agent, or Firm* — Richard Eldredge; Leavitt and Eldredge Law Firm

(57) ABSTRACT

A laptop case and shade component system. The clamshell style laptop case provides a lid and a base connected via a case hinge which joins the lid and the base along their corresponding rear edges. The lid and base, respectively, each have a front edge portion and left and right side edge portions. Two gussets interconnect the lid to the base along their respective two side edge portions. A shade component can be attached to a portion of the front edge and left and right side edge portions of the lid to shield a laptop device placed within the opened laptop case from direct sunlight. The shade component can be moved to its collapsed position via a hinge at its bottommost point, detached from the lid, and retained along the interior surface of the case's lid for storage purposes.

11 Claims, 10 Drawing Sheets

(56) References Cited

U.S. PATENT DOCUMENTS

| | | | |
|---|---|---|---|
| 2005/0205444 A1 | 9/2005 | Harlocker | |
| 2007/0159781 A1* | 7/2007 | Zbikowski | A47B 3/08 |
| | | | 206/320 |
| 2010/0021155 A1* | 1/2010 | Orzeck | G03B 17/00 |
| | | | 396/428 |
| 2010/0224532 A1* | 9/2010 | Gonzalez | A47B 23/04 |
| | | | 206/320 |
| 2012/0329580 A1* | 12/2012 | Weitzner | A63F 13/213 |
| | | | 473/415 |
| 2013/0341233 A1* | 12/2013 | Dow | A45C 11/00 |
| | | | 206/521 |
| 2014/0009004 A1* | 1/2014 | Schroeder | H05K 9/0043 |
| | | | 307/326 |
| 2016/0269068 A1* | 9/2016 | Tymus | H04B 1/3888 |
| 2017/0300086 A1* | 10/2017 | Blattel | B65D 25/24 |
| 2017/0322590 A1* | 11/2017 | Jacobs | H04M 1/026 |
| 2020/0033918 A1* | 1/2020 | Akalou | G06F 1/1603 |
| 2021/0041057 A1* | 2/2021 | Jankura | F16M 11/10 |

\* cited by examiner

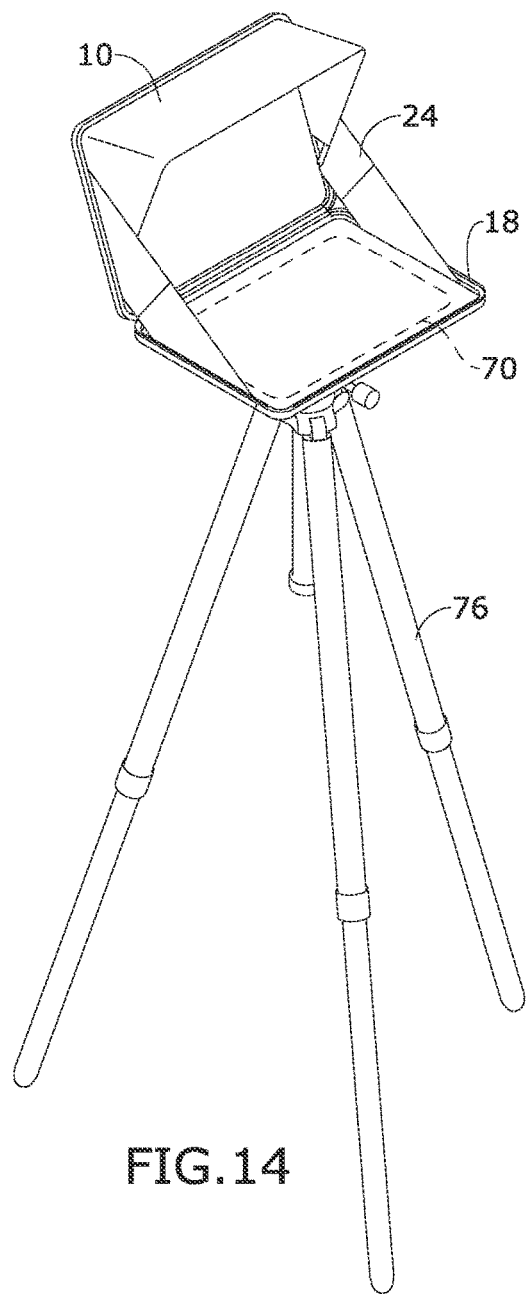
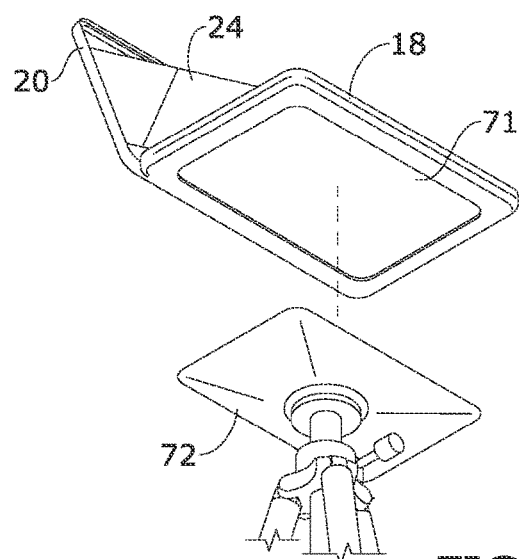
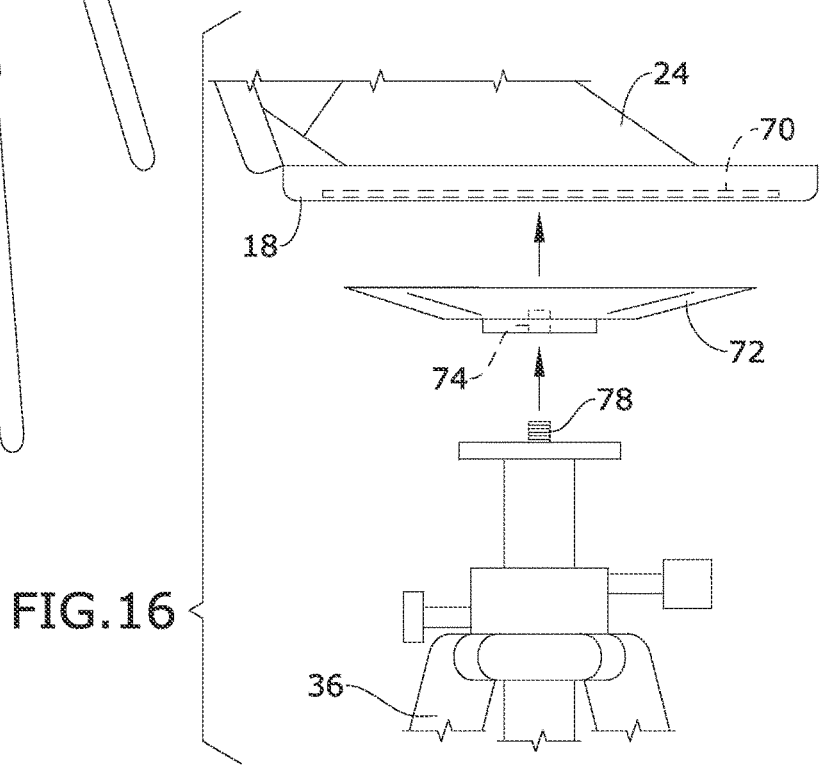
FIG.14
FIG.15
FIG.16

LAPTOP CASE AND COLLAPSIBLE SHADE SYSTEM

BACKGROUND OF THE INVENTION

The present invention relates to laptop accessories and, more particularly, a laptop case containing a shade component, wherein the shade component can be collapsed and stored along the interior planar surface of the case.

A laptop (also known as a laptop computer or notebook computer) is a small, portable personal computer with a monitor and a keyboard. Laptops typically consist of a monitor on the inside of the upper lid and a keyboard on the inside of the lower base, wherein the monitor and the keyboard are movable between a closed configuration and an open configuration for use. The compact, portable nature of laptops allows for their use almost anywhere, but when being used outdoors or near a window sunlight can cause an obstructive glare on the monitor and/or overheat the laptop.

Laptop cases can keep sunlight off the body of the laptop; however, current laptop cases do not have a shade-like component that attaches to the lid of the case that partially blocks the monitor and keyboard components from direct sunlight exposure when the laptop is in the open configuration. This forces the user to improvise using makeshift shades which tend to lack a secure attachment to the case, and which are not specifically designed to collapse and be stored with the laptop case when not in use.

As can be seen, there is a need for a laptop case with a shade component which can be attached to a portion of the perimeter of the lid of the case to shade a laptop from unwanted light, thereby reducing glare and preventing the laptop from overheating, and wherein the shade component is collapsible for convenient storage along the interior surface of the same laptop case.

SUMMARY OF THE INVENTION

The primary invention is a laptop case having a shade component that can be attached to the lid portion of the case. The shade component is movable between an expanded position and a collapsed position. In the expanded position the shade component is removably attached to a perimeter of the lid portion of the case and fully extended in order to maximize the coverage over a laptop contained within the open case. In the collapsed position, the shade component can be detached from the perimeter of the case and securely stored along an interior surface of the lid portion of the case.

The present invention also provides side gussets which offer additional shading.

The present invention contemplates a recess along the bottom of the base of the case whereby the case can be mounted on a tripod to create a portable or mobile desk experience.

The present invention has a unique functionality whereby the shade component can be collapsed and securely stored within the vertical interior of the lid of the case when not in use so that it is out of view.

An apparatus of the present invention has an expandable shade which can be attached to the perimeter of the top front lid of the case when the case is in its open configuration, thereby creating an awning or hood over the top of the laptop. There are also side gussets that expand between the lid and the base of the case on each side designed to block the sun from the side angles. The two side gussets also support the clamshell case as the lid portion of the case 'leans back' (i.e., an angle of incidents between the base and the lid, in the open position, is equal to or greater than ninety degrees.

There are no other solutions that have the clamshell style case which also have a collapsible shade component which removably attaches to the perimeter of the lid of the case, and which can be expanded to maximize the shaded area. Also, there are no products in which the shade can be collapsed and securely stored vertically within the lid of the case. Other shading devices do not provide the user with the ability to collapse the shade device in the same way as well as store the collapsed shade in the same fashion.

In one aspect of the present invention, a laptop case system includes a clamshell style case comprising two halves: a top half referred to as the "lid" and a bottom half referred to as the "base" connected via a hinge which joins the lid and base along their corresponding rear edges, wherein the lid and the base, respectively, are rectangular and therefore each have three additional sides in addition to their corresponding rear edges where the hinge connects the lid and the base. These three sides include a front edge, representing the front edge of the lid and the front edge of the base of the clamshell style case, as well as left and right side edges. The present invention also includes a shade component designed to removably attach to a portion of the front edge and left and right side edges of the lid.

In another aspect of the present invention, the laptop case system further includes functionality wherein the shade component movable between an expanded position where the shade is fully deployed to maximize the amount of shade coverage provided, and a collapsed position wherein the shade component is flattened in a planar position. The shade component comprises a front frame and a rear frame connected via a hinge located at their bottommost points, where, when the shade is in its expanded position, the front and rear frames expand at least two inches apart from each other on the ends opposite of their pivot/hinge point along the upper portion of the shade allowing the shade fabric or other material to be expanded over a laptop positioned within the case. Additionally, two storage slots along an interior surface of the lid are designed and dimensioned to store the front and rear frames of the shade component in its collapsed position. Some embodiments may further include a plurality of connection points along the interior surface of the three sides of the lid; intended to connect to the back edge of the rear frame of the shade component; a recess along a bottom surface of the base and a magnet embedded in the base just inward of the recess; and further including a tripod mount dimensioned to be received in the recess.

These and other features, aspects and advantages of the present invention will become better understood with reference to the following drawings, description and claims.

BRIEF DESCRIPTION OF THE DRAWINGS

FIG. 14 is a top front perspective view of an exemplary embodiment of the present invention, shown in use with the tripod.

FIG. 15 is a bottom exploded perspective view of an exemplary embodiment of the present invention, illustrating the attachment of the tripod mount.

FIG. 16 is a side elevation exploded view of an exemplary embodiment of the tripod mount of the present invention.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a laptop case and shade component system. The clamshell laptop case provides a lid which is connected to a base via a hinge which joins the lid and base along their corresponding rear edges so that the case moves between an open configuration and a closed configuration. The lid and base each have two side edge portions and a front edge portion (opposite the hinge that connects the lid and base of the case). Two gussets interconnect the lid to the base along their respective two side edge portions so that as the laptop case is brought into a closed position from its open position the side gussets fold inward within the laptop case. The shade component can be attached to the top portion of the case's lid to partially shield a laptop device placed within the case from direct sun exposure. The shade component can be moved into its collapsed position by moving the shade's front and rear frames together via their hinge point. Additionally, the shade can be detached from the lid of the case by removing the back edge of the shade's frame from the connection points along the perimeter of the case's lid and retained/stored along an interior surface of the lid of the case for storage purposes.

Referring now to FIGS. 1 through 24, the present invention may include a laptop case 100 for a laptop 28. The laptop case 100 may have a clamshell arrangement or style, wherein a lid 20 is pivotably connected to a base 18 via a hinge along the length of both of their adjacent rear edges so that the lid and base of the case can move between an open configuration and a closed configuration. The lid is designed and dimensioned to contain the monitor assembly of the laptop 28, while the base 18 is designed and dimensioned to contain the keyboard assembly of the laptop 28.

Figure 1:
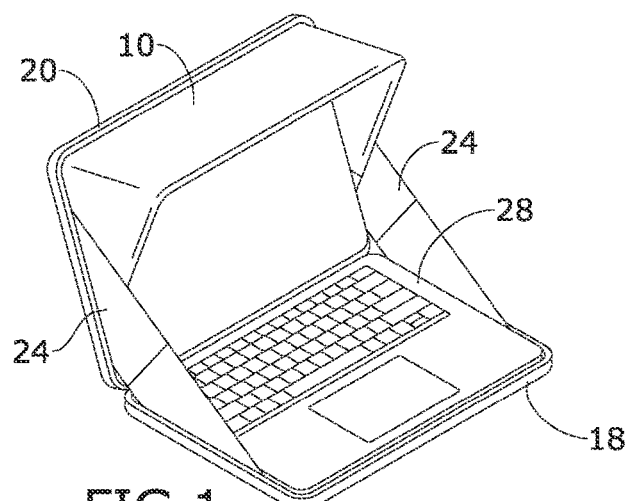
FIG. 1 is a perspective view of an exemplary embodiment of the present invention, shown in use holding a laptop.
Figure 2:
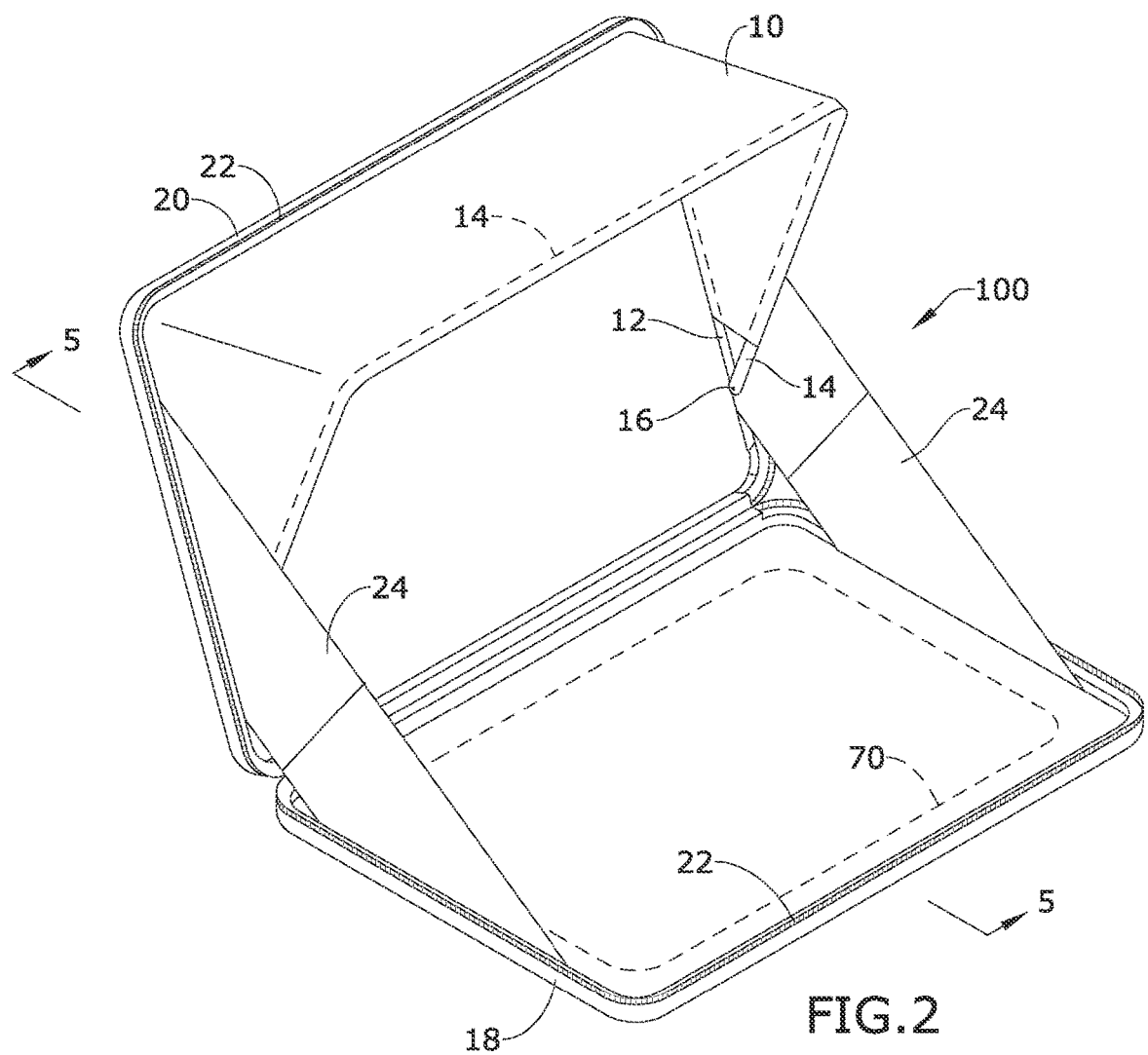
FIG. 2 is a perspective view of an exemplary embodiment of the present invention, shown in an open configuration with the shade component expanded.
Figure 3:
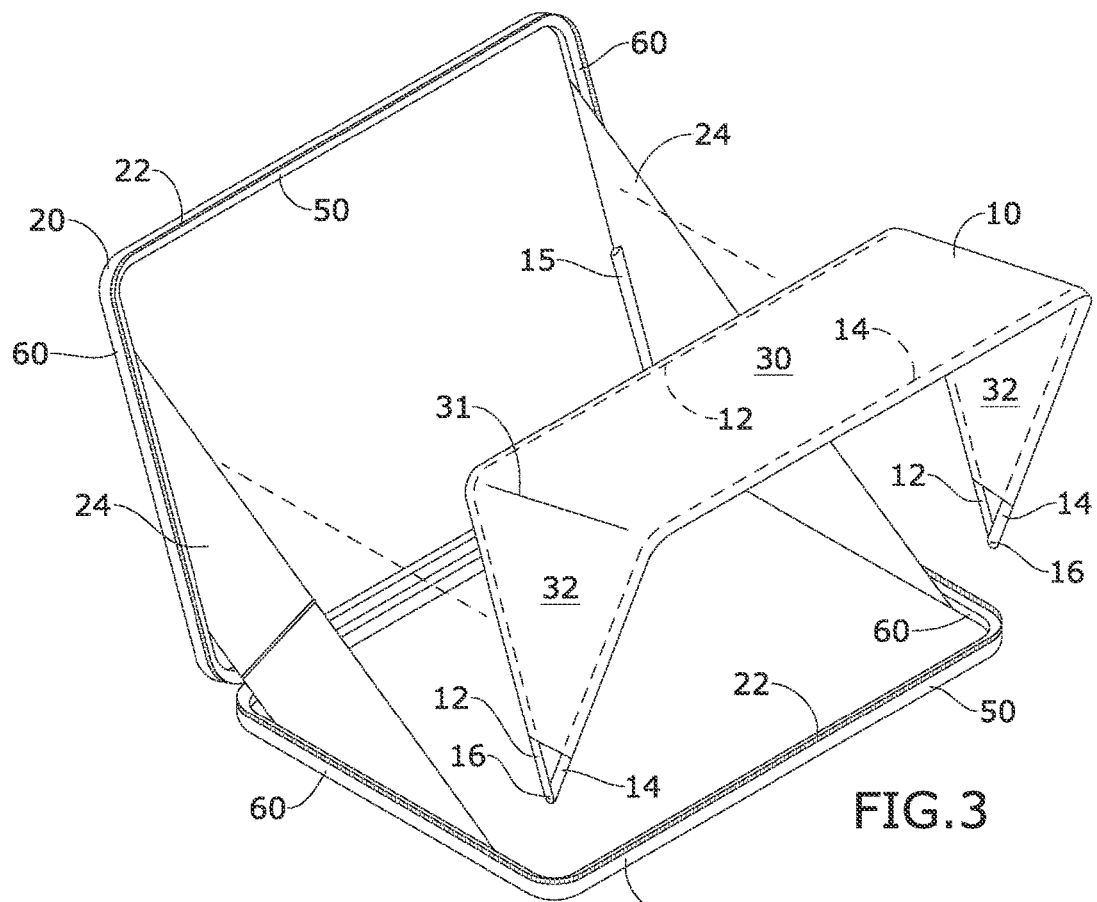
FIG. 3 is an exploded perspective view of an exemplary embodiment of the present invention.
Figure 4:
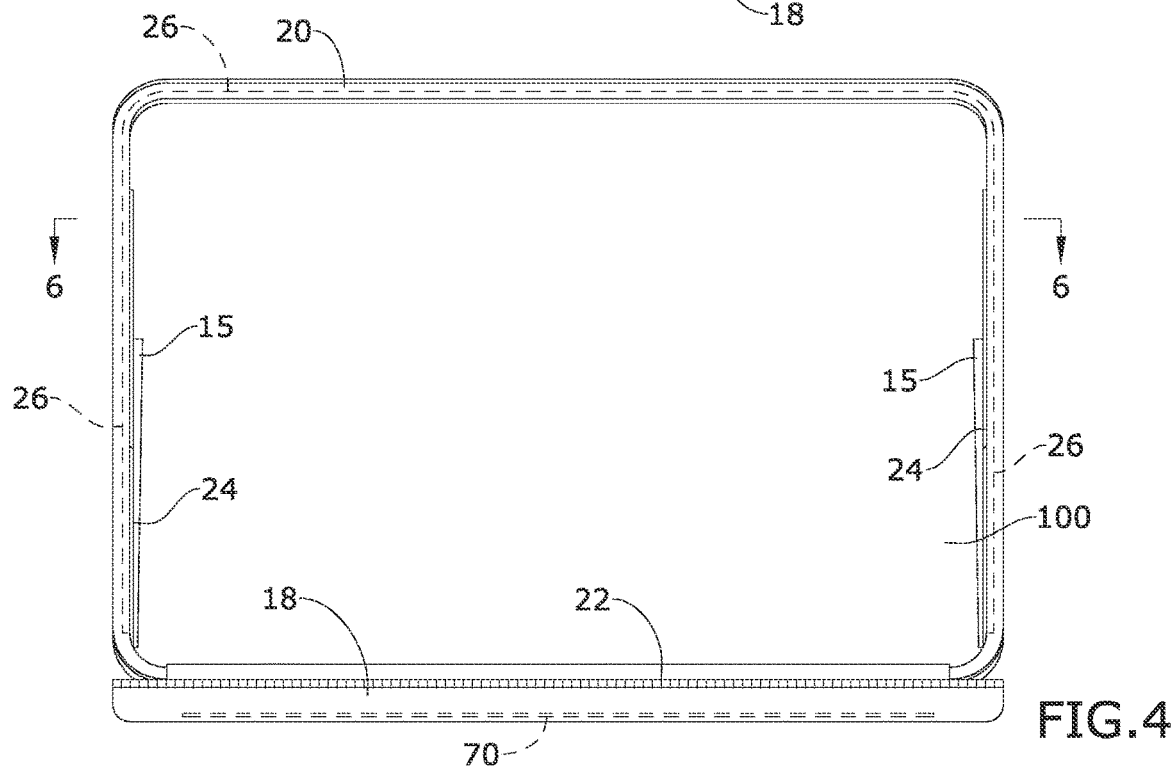
FIG. 4 is a front elevation view of an exemplary embodiment of the present invention with the shade component detached, and using dashed lines to showing attachment points for the shade component.
Figure 5:
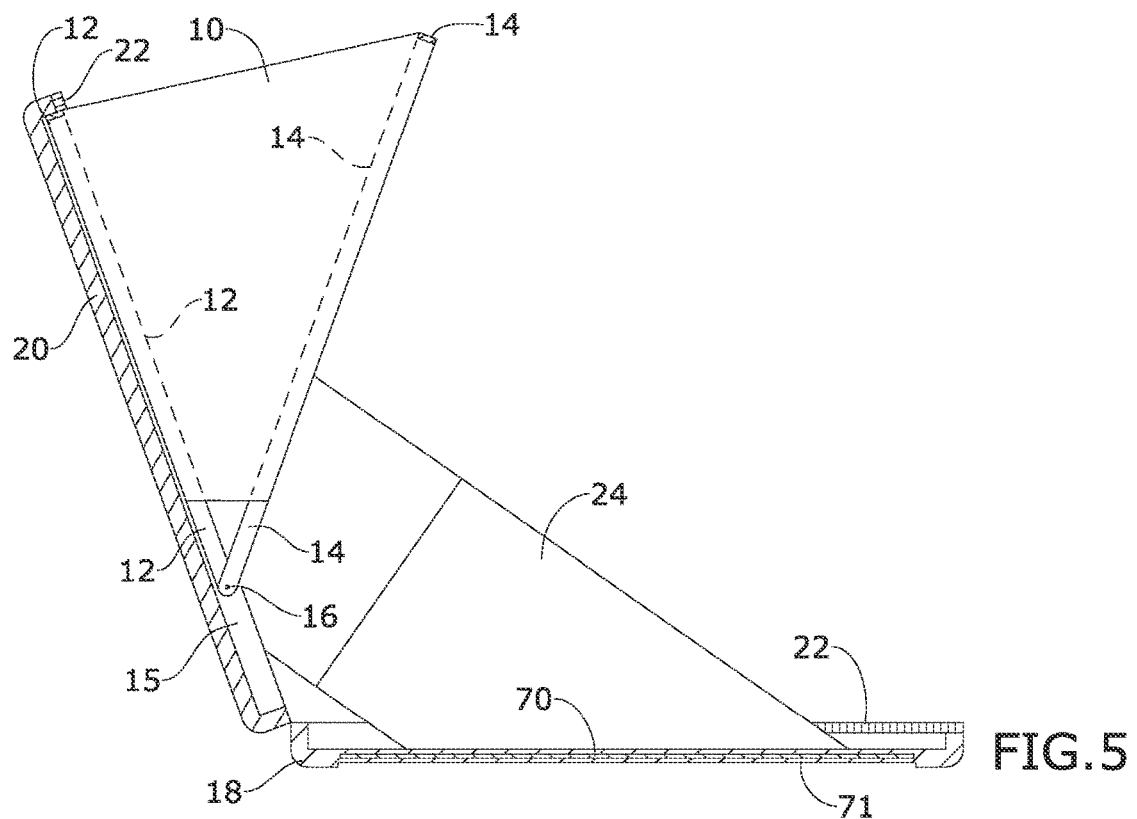
FIG. 5 is a section view of an exemplary embodiment of the present invention, taken along line 5-5 in FIG. 2.
Figure 6:
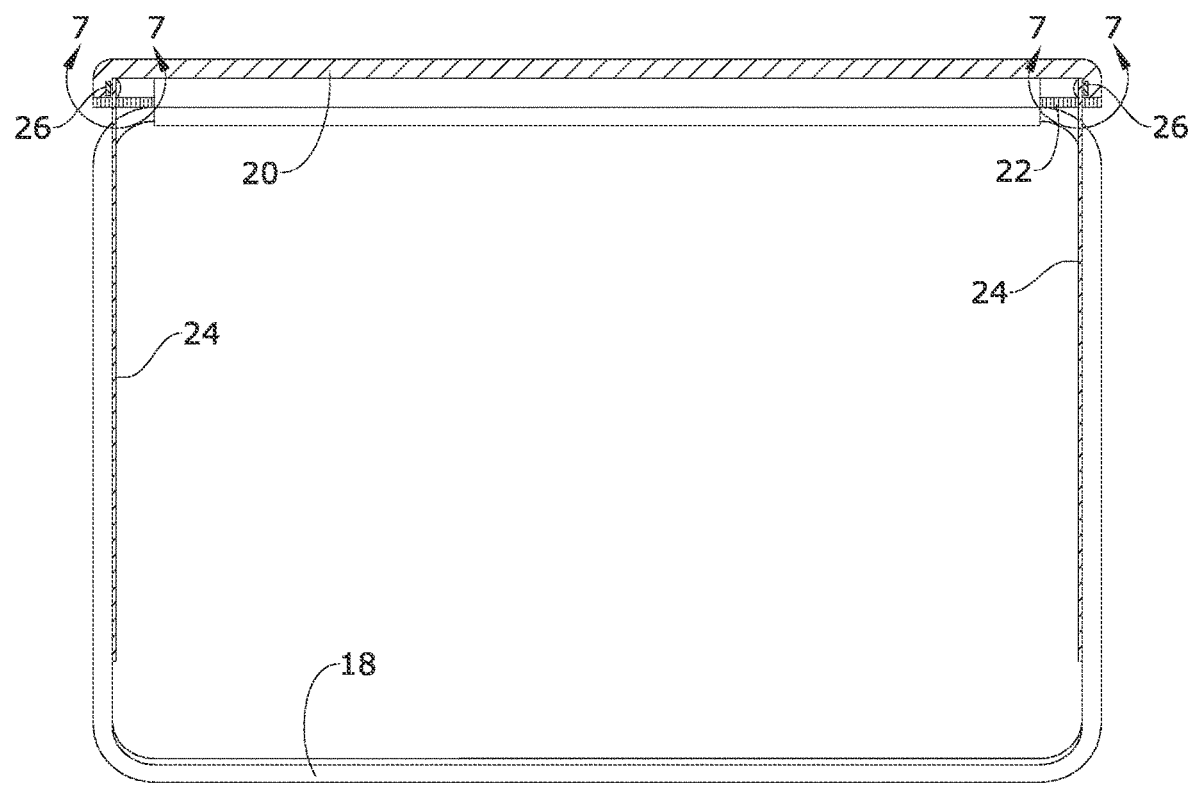
FIG. 6 is a section view of an exemplary embodiment of the present invention, taken along line 6-6 in FIG. 4.
Figure 7:
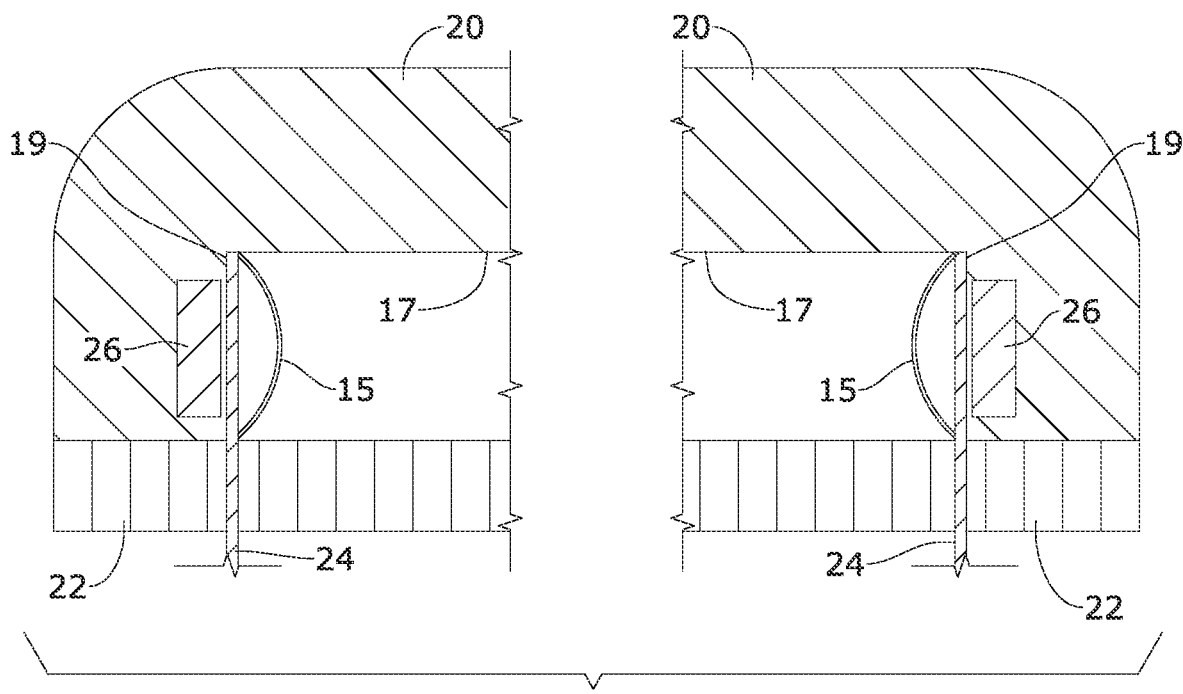
FIG. 7 is a detailed section view of an exemplary embodiment of the present invention, taken along line 7-7 in FIG. 6.
Figure 8:
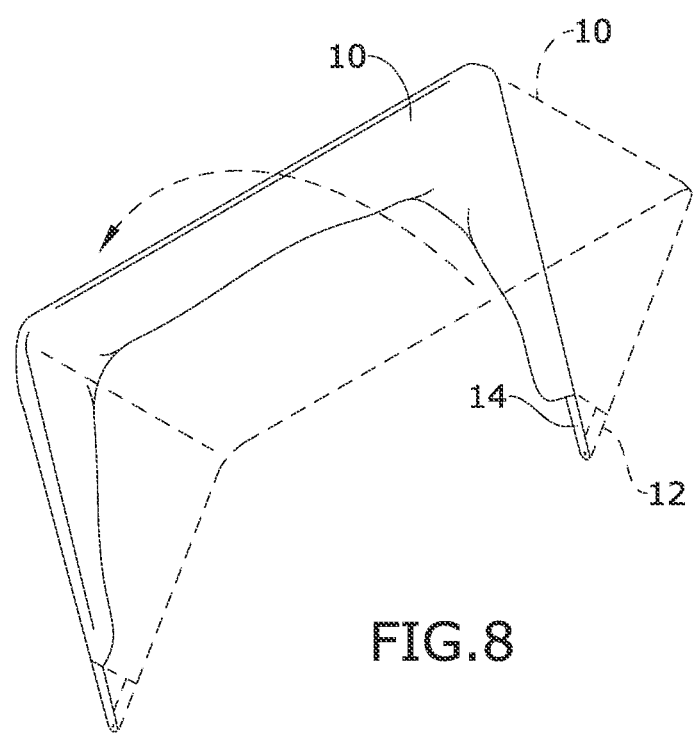
FIG. 8 is a perspective view of an exemplary embodiment of the present invention, illustrating collapsing the shade component for storage in the lid portion of the case.
Figure 9:
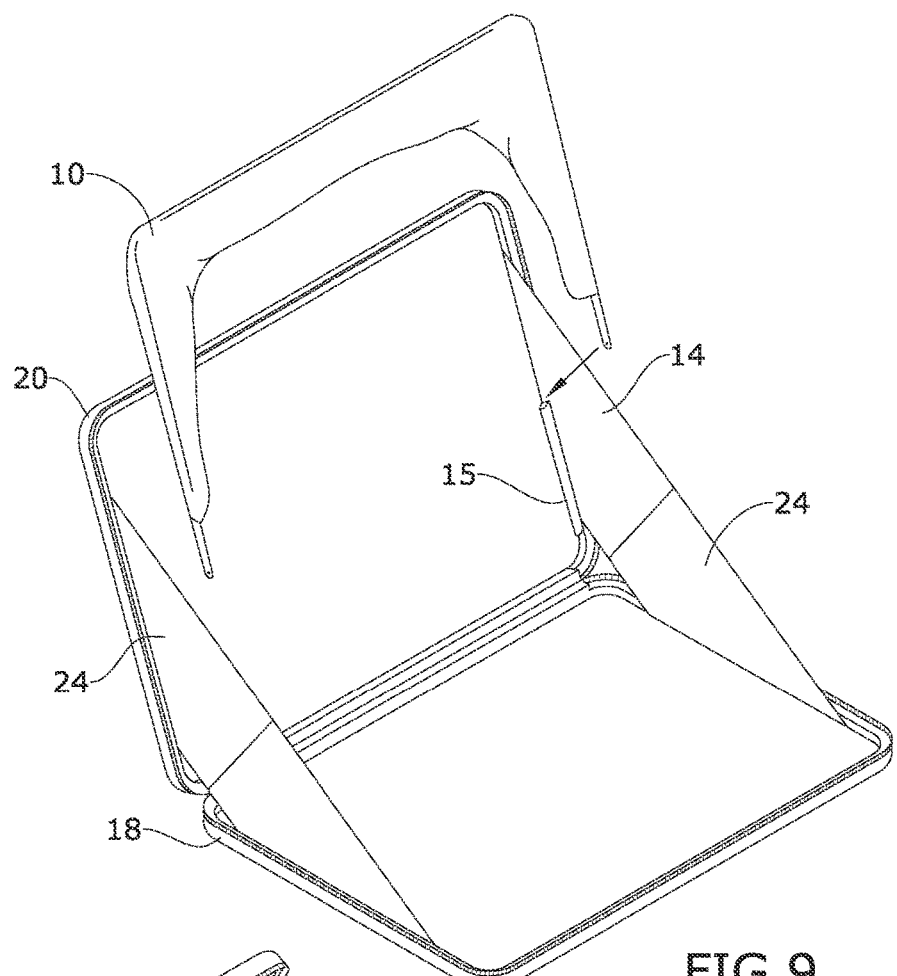
FIG. 9 is a perspective view of an exemplary embodiment of the present invention, illustrating insertion of the shade component into pockets along an interior of the lid portion.
Figure 10:
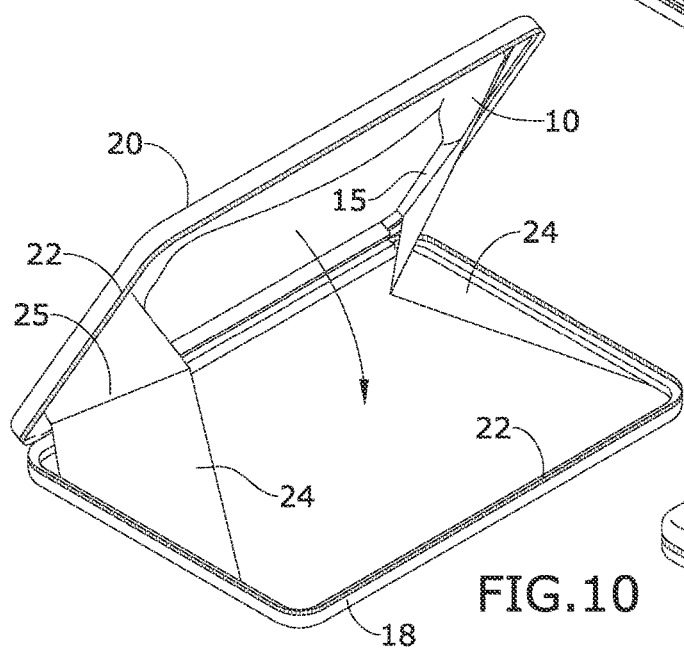
FIG. 10 is a perspective view of an exemplary embodiment of the present invention, illustrating moving the case from the open configuration to the closed configuration.
Figure 11:
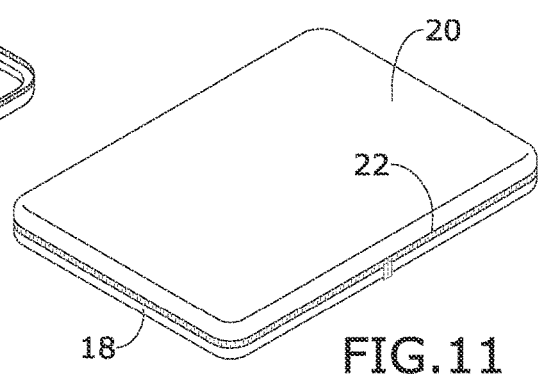
FIG. 11 is a perspective view of an exemplary embodiment of the present invention, illustrating the closed configuration.
Figure 12:
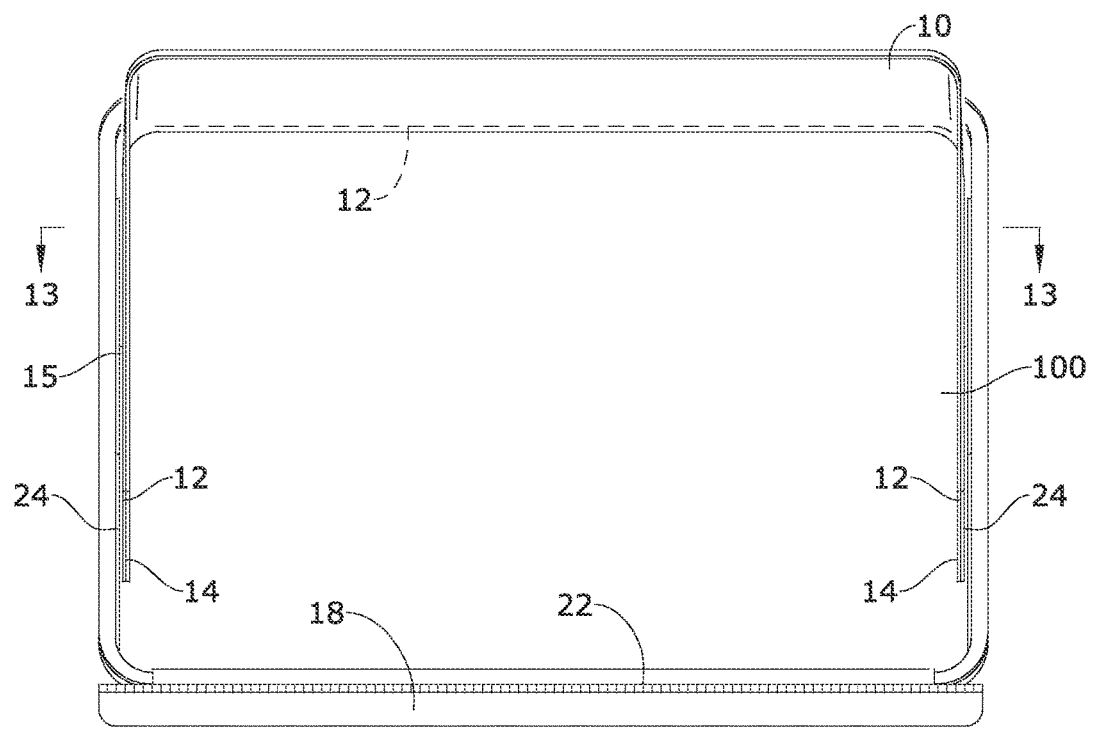
FIG. 12 is a front view of an exemplary embodiment of the present invention, with the shade component deployed.

Referring specifically to FIG. 3, the lid 20 and the base 18 each have a front edge portion 50 and left and right side edge portions 60. The edge portions 50 and 60 perpendicularly extend from the lid 20 and the base 18 so that when the case is in the closed configuration the edge portions 50 and 60 of the lid 20 and the base 18 contact each other. The edge portions 50 and 60 may each have complimentary fasteners 22, which may include, but not limited to a zipper, for securely joining the lid 20 and the base 18 when the case is in the closed configuration. The lid 20 and the base 18 may be made of EVA foam or other materials suitable for a laptop case.

A left gusset 24 may extend between a left side edge portion 60 of the lid 20 to the left side edge portion 60 of the base 18. Likewise, a right gusset 24 may extend between the right side edge portions 60 of the lid 20 and the base 18. Each gusset 24 may have a fold line 25 at approximately its midpoint to facilitate it folding inward when the laptop case 100 is shifted to the closed configuration. Referring the FIG. 7, ends of the gusset 24 may be attached to an interior surface 19 of the side edge portion 60.

The shade component 10 has an upper portion 30 and left and right side edge portions 32 arranged to define an upside-down U-shape. A front frame 14 and a rear frame 12 may define the front and rear edges, respectively, of the shade component 10. Distal ends of the front and rear frames 14 and 12 of the shade may be pivotably joined by way of a shared pivot/hinge point 16. The pivot point 16 may be a hinge or hinge-like component. The front and rear frames 14 and 12 of the shade may move relative to each other by rotating the frames at their shared pivot/hinge point 16, whereby the shade component 10 moves between an expanded position and a collapsed position. In the collapsed position the front and rear frames 14 and 12 are adjacent to each other. In the expanded position, the front and rear frames 14 and 12 may be spaced apart by two or more inches along the upper portion opposite their pivot/hinge point 30.

Figure 13:
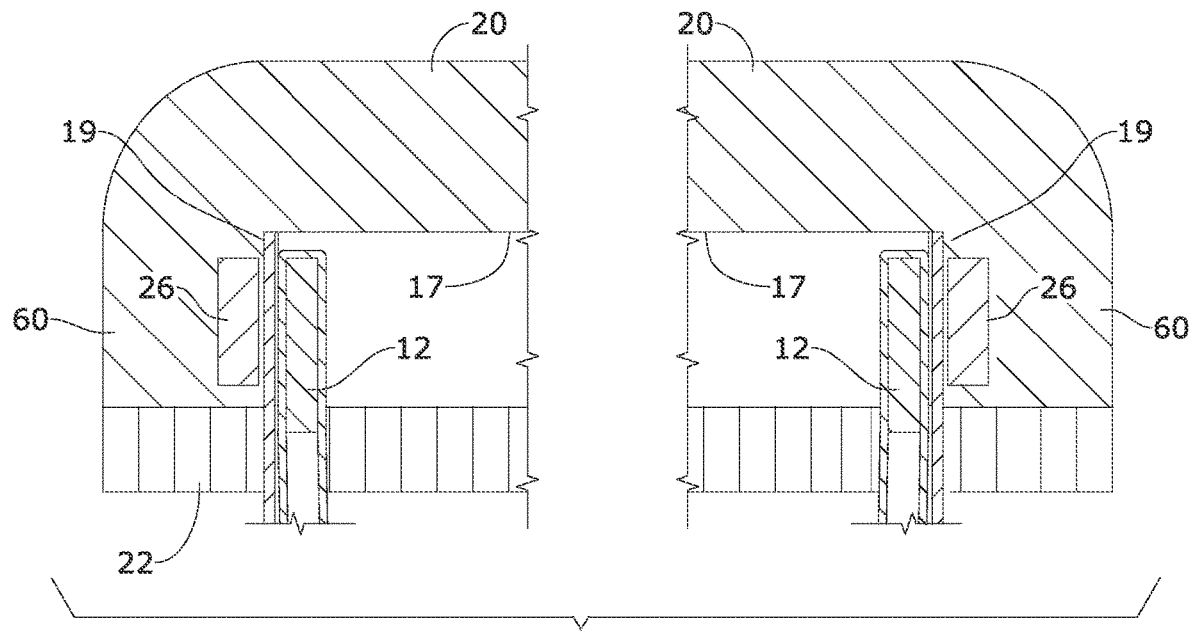
FIG. 13 is a detail section view of an exemplary embodiment of the present invention, taken along line 13-13 in FIG. 12.
Figure 17:
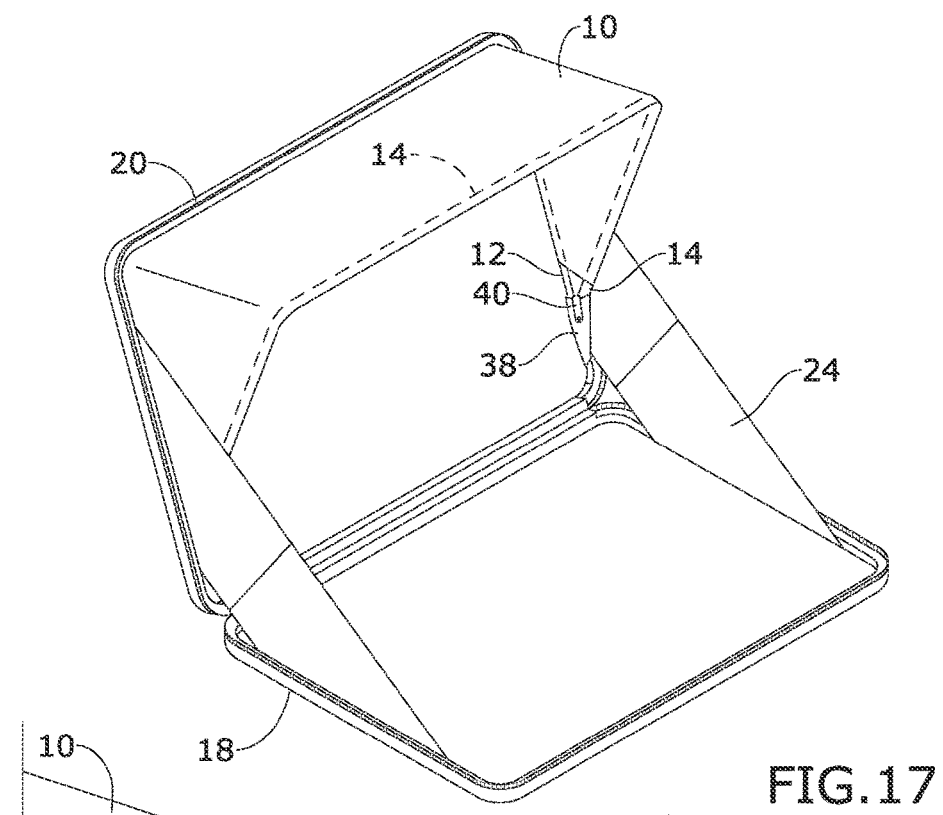
FIG. 17 is a perspective view of an alternate embodiment of the invention, with pocket 40 and retainer 42.
Figure 18:
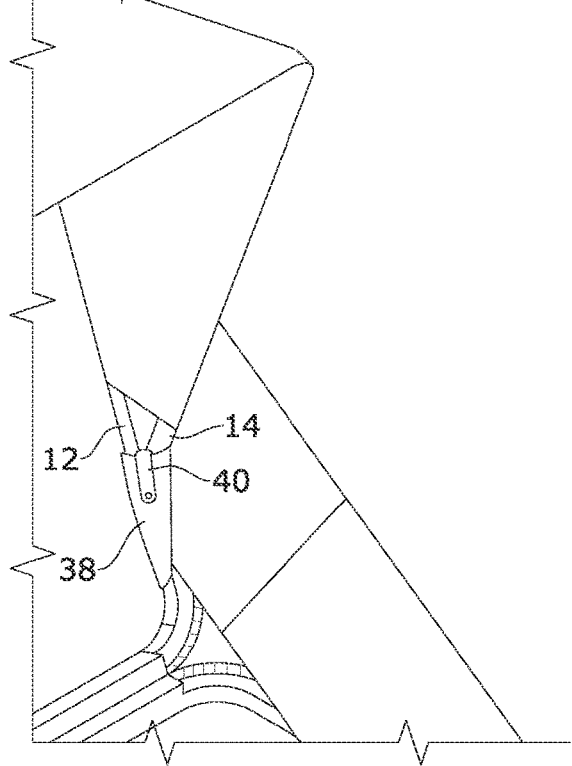
FIG. 18 is a detail view of pocket 40 and retainer 42 with the shade in its expanded position.
Figure 19:
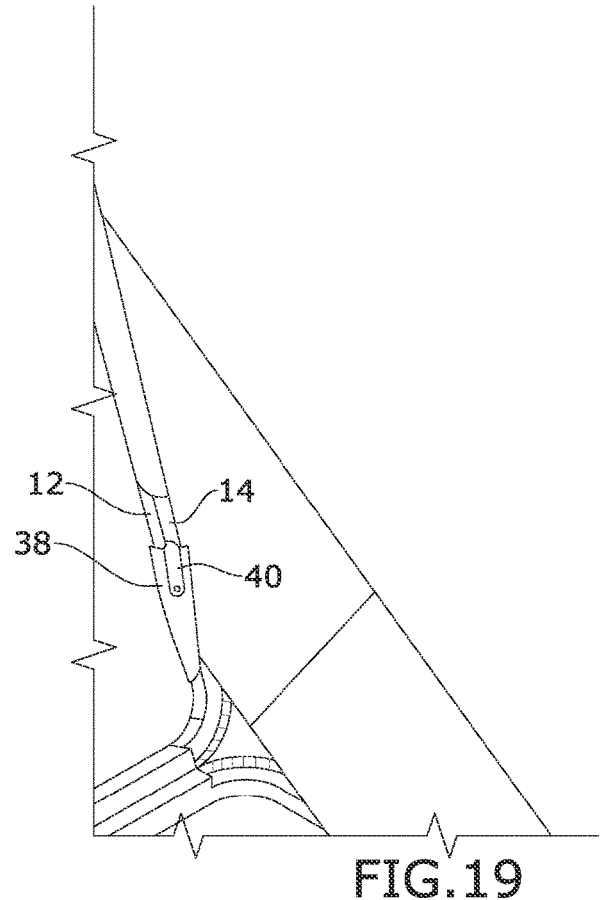
FIG. 19 is a detail view of pocket 40 and retainer 42 with the shade in its collapsed position.
Figure 20:
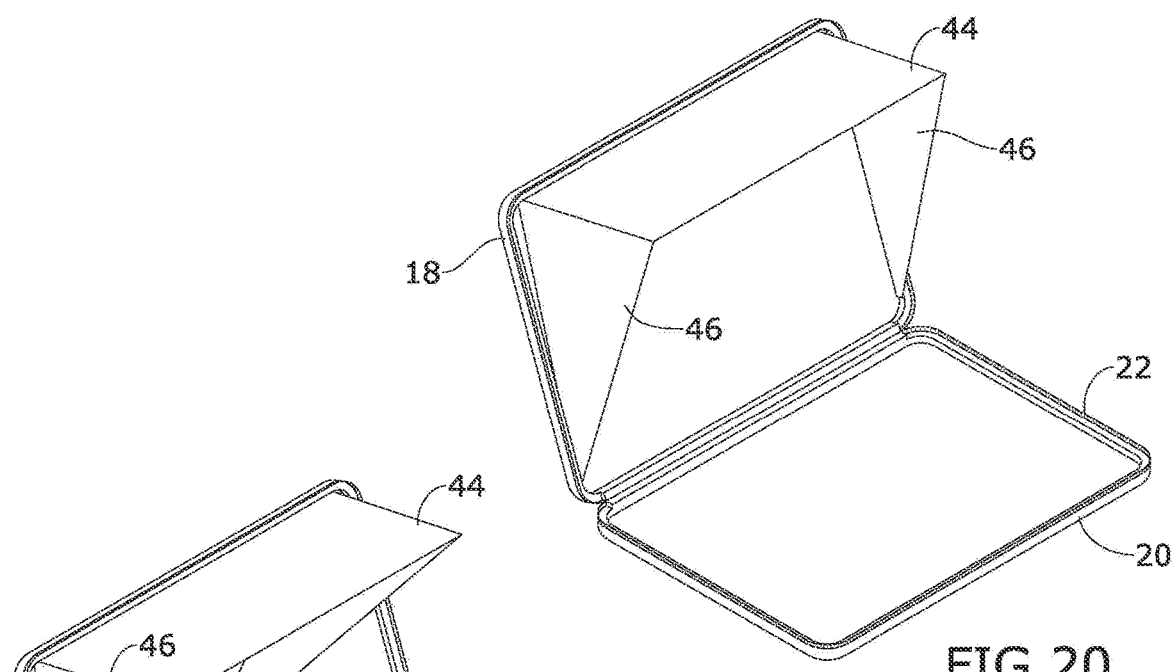
FIG. 20 is a perspective view of an alternative embodiment of the present invention.
Figure 21:
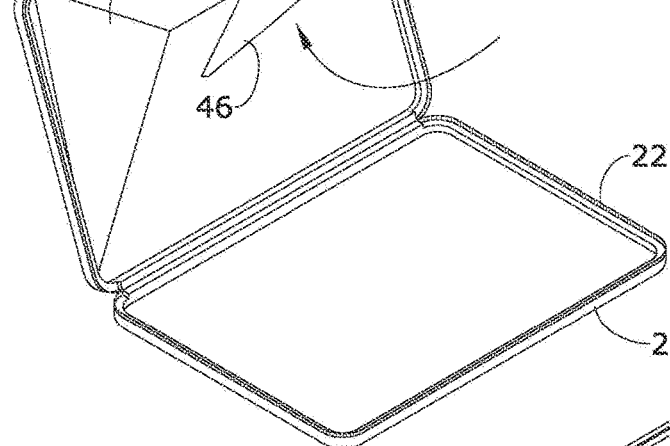
FIG. 21 is a perspective view of an alternative embodiment of the present invention, showing step one of a storage process.
Figure 22:
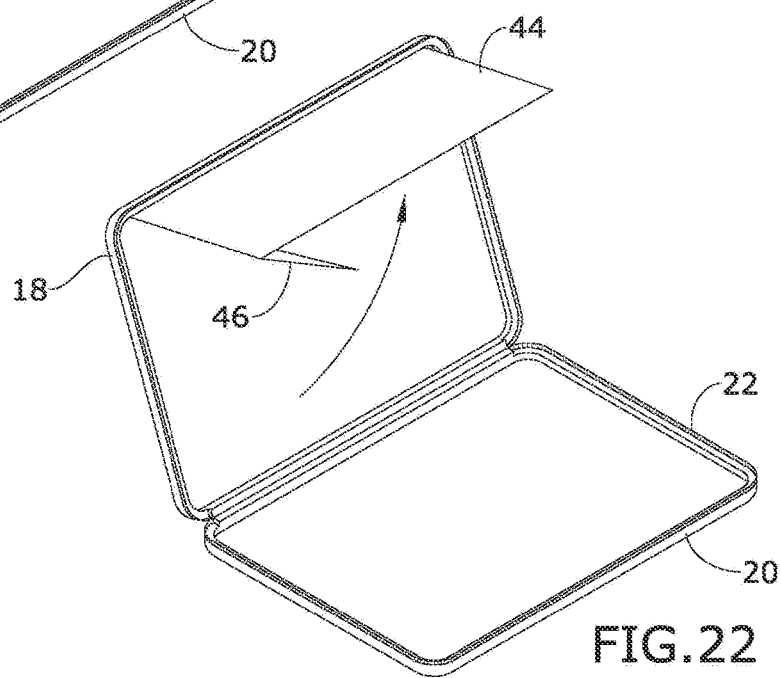
FIG. 22 is a perspective view of an alternative embodiment of the present invention, showing step two of the storage process.
Figure 23:
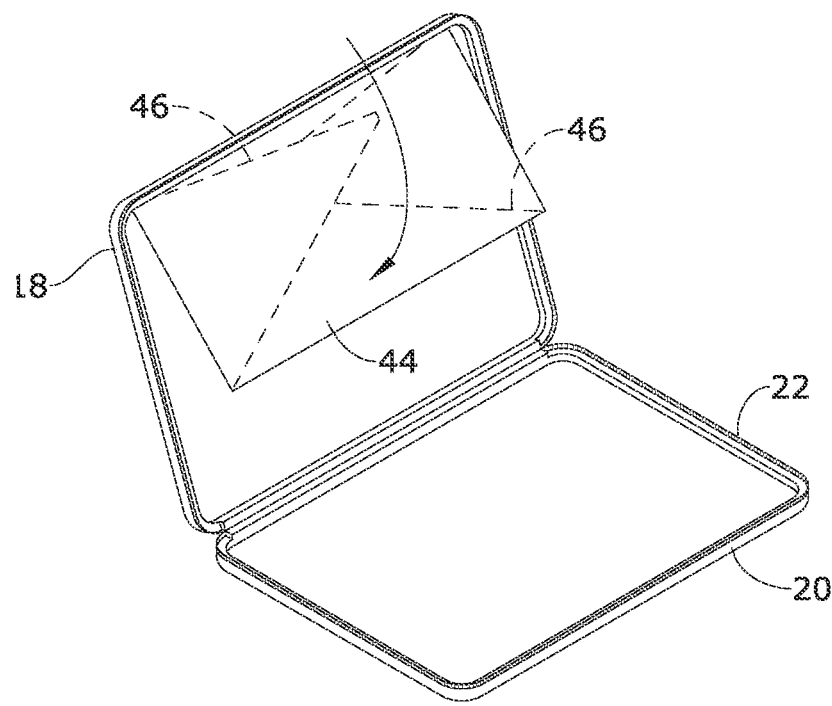
FIG. 23 is a perspective view of an alternative embodiment of the present invention, showing step three of the storage process.
Figure 24:
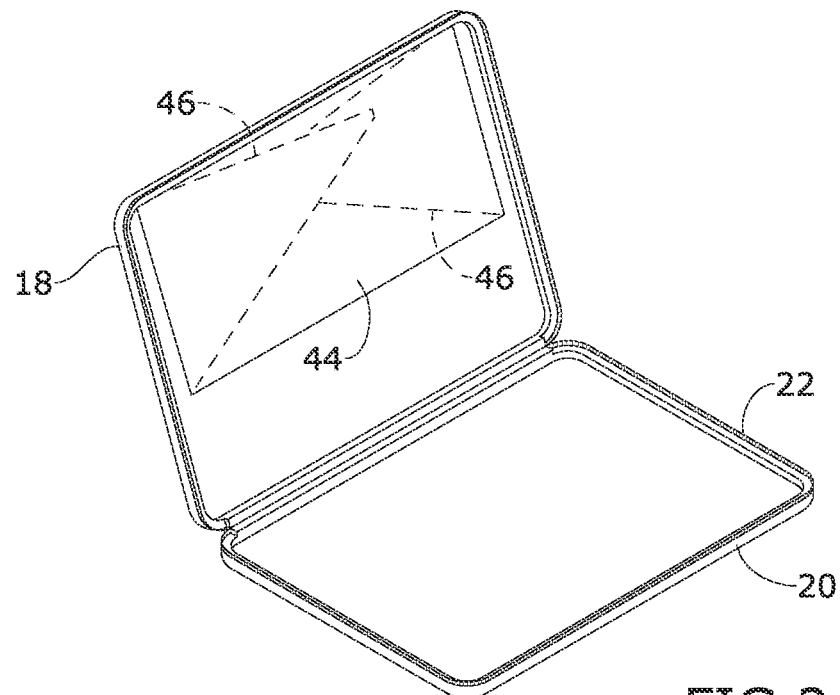
FIG. 24 is a perspective view of an alternative embodiment of the present invention, showing the shade stored.

Connection points 26 are provided along an interior surface 19 of the front edge and left and right side edge portions 50 and 60 of the lid 20. The connection points 26 may be magnetizable material, snaps, adhesives, hook and loop fasteners, or any other joining element used for removably connecting one object to another object. In the embodiment that the connection points 26 are magnetizable material, they may be embedded along said interior surface 19. Though not all types of connection points 26 may be embedded as shown in FIG. 13, as some connection points 26 may be attached directly to the interior surface 19.

The connection points 16 removably connect to complementary connection points along the rear frame 12 of the shade component 10 so that the shade component 10 can be selectively attached and detached from the interior surface 19 of the front edge 50 and left and right side edge portions 60 of the lid. In the embodiment where the connection points 26 are magnetizable material, the rear frame 12 may be ferromagnetic material that magnetically connects to the magnetizable material. Again, though not shown in the Figures, the rear frame 12 may provide hook or loop portions, snaps or other removable connection points in the embodiments that do not include magnetizable material.

Referring to FIGS. 14-16, a bottom surface of the base 18 may provide a recess 71. Just inward of the recess 71 may be an embedded magnet 70. The recess 71 may be dimensioned and adapted to receive an upper portion of a tripod mount 32. The upper portion of the tripod mount 32 may be made of ferromagnetic material that is magnetically attracted to the embedded magnet 70. A lower portion of the tripod mount 32 may provide a threaded hole 34. The threaded hole 34 is dimensioned and adapted to secure to a threaded shaft 38 along an upper portion of a tripod 36.

In use, while the apparatus 100 is in the open configuration, the expanded shade component 10 may be attached along a periphery of the lid 20 by way of the connection points 16 to shield a laptop contained within the case from light. The shade component 10 can be detached from the connection points when desired. Furthermore, a user may move the shade component 10 to its collapsed position by way of the pivot points 16 or hinges. In the collapsed position, the distal ends of the front and rear frames 14 and 12 of the shade component 10 may be stored in sleeve slots 15 disposed along an interior face 17 of the lid 20 and/or interior surface 19 of its left and right side edge portions 60, thereby the collapsed shade component 10 may be secured against the interior surface of the lid 20 in either of the case's open and closed configurations.

Referring to FIGS. 20-24, the present invention contemplates an alternative shade component attached only along an upper front edge of lid 20. The alternative shade component includes a top panel 44 attached to an upper front edge of the lid by way of a hinge, and two side panels 46 which are only connected to each side of the top panel, respectively, in such a way that each side panel is movable between a storage position where the side panels 46 are folded inward along the interior planar surface of the lid of the case, and an extended position wherein the side panels 46 extend downward perpendicular to the top panel 44.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affects the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A laptop case and shade system, comprising:
    a clamshell case comprising two halves:
        a lid; and
        a base which are joined along their corresponding rear edges;
    a shade component comprising a front frame and a rear frame which are connected via a shade hinge located at the bottommost point of each of said frames; and
    a flexible fabric that is attached to said shade frames which extends between the front frame and the rear frame when the shade component is in the expanded position.

2. The laptop case and shade system of claim 1, wherein the shade component is configured to removably attach to a portion of a front of the lid.

3. The laptop case and shade system of claim 2, wherein the shade component is movable between an expanded position and a collapsed position by way of said shade hinges, and wherein the shade component is in a flattened form when in its collapsed position.

4. The laptop case and shade system of claim 3, wherein the shade component, when in its expanded position comprises an upper portion and two side portions defining an upside-down U-shape.

5. The laptop case and shade system of claim 4, where, in the expanded position, the front and rear frames of the shade component are at least two inches apart from each other on the ends opposite of their pivot/hinge point along the upper portion of the shade.

6. The laptop case and shade system of claim 1, further comprising two storage slots along an interior surface of lid, wherein the two storage slots are dimensioned to retain the frames of the shade component when the shade is in the collapsed position.

7. The laptop case and shade system of claim 6, wherein the lid of the case further comprises of a front edge portion and left and right side edge portions, wherein each edge portion extends orthogonally relative to the lid.

8. The laptop case and shade system of claim 7, further comprising two gussets, each gusset interconnect the lid to the base along their respective two side edge portions so that as the clamshell case is brought to a closed condition from an open condition the two gussets fold inward within the clamshell case.

9. The laptop case and shade system of claim 8, comprising a plurality of connection points along the front edge and left and right side edges of the lid, wherein the plurality of connection points provide a means to removably attach the back edge of the shade component's rear frame to the lid.

10. The laptop case and shade system of claim 1, further comprising:
   a recess along a bottom surface of the base; and
   a magnet embedded in the base just inward of the recess.

11. The laptop case and shade system of claim 10, further comprising:
   a tripod mount dimensioned to be received in the recess.

\* \* \* \* \*